May 12, 1959 C. G. THIEL 2,886,217
DISPENSING DEVICE
Filed May 20, 1957
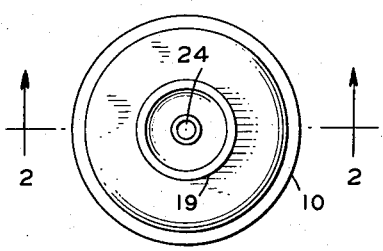
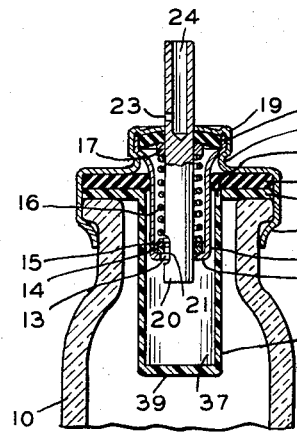
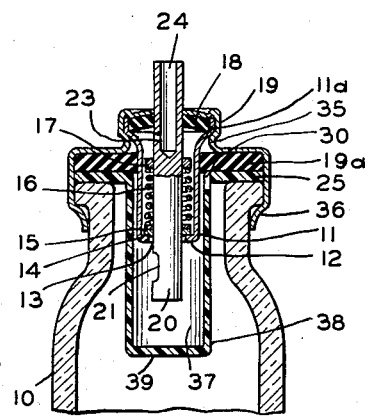
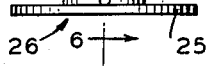
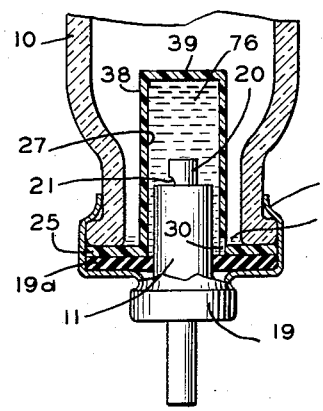
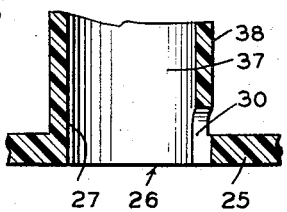
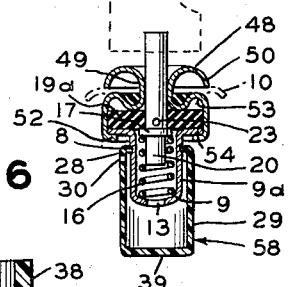

United States Patent Office
2,886,217
Patented May 12, 1959

2,886,217

DISPENSING DEVICE

Charles G. Thiel, Santa Monica, Calif., assignor to Riker Laboratories, Inc., Los Angeles, Calif., a corporation of Delaware Application May 20, 1957, Serial No. 660,379

4 Claims. (Cl. 222—394)

The present invention relates to draining or discharging devices which assist in removing residual amounts of liquid from pressurized containers.

It has generally been the practice in pressurized containers, such as the familiar "aerosol" bombs, to employ a piece of flexible tubing, or "dip-tube," to connect the valve or closure mechanism at the top of the container with the bottom of the container. This permits the liquid contents of the container to flow from the bottom of the container, under the pressure exerted by the gas in the container, upward to the discharge valve or closure mechanism. The dip-tube possesses certain disadvantages. First, the dip-tube can extend downward in only one direction and toward only one side of the bottom of the container. This means that the container must be tilted in that direction when expelling residual amounts of liquid if they are to be scavenged effectively from the container. This is often not practical to do since the container walls are often opaque. Also, it is frequently difficult to measure and place the dip-tube in the container with such precision that it always reaches all of the way to the bottom. This may cause loss of residual amounts of material which cannot be discharged from the container. Furthermore, there is the possibility that vapor may become entrapped in the dip-tube during changes in position or shaking of the container while being transported or handled. This will result in the delivery of irregular and reduced amounts of liquid to the valve or closure mechanism. This presents a particularly serious problem in the case where a metering valve is employed, since an incomplete dose or quantity of liquid is dispensed. Also, if the liquid is not homogeneous and segregates or separates in the tube, i.e., a separated emulsion, it cannot conveniently be shaken while in the tube to restore the liquid to a homogeneous state. This results in non-uniform material being discharged.

One proposal for overcoming the difficulties which arise from the use of a dip-tube has been to omit it altogether and to discharge the contents of the pressurized container while the container is in an inverted position, with the valve or discharge mechanism facing downward, with its liquid inlet opening covered by the liquid contents of the container. This proposal is an improvement over the dip-tube in many respects, but it does not provide for the effective discharge of substantially all of the contents of the containers. It is not practical to construct the valve or discharge closure in such a manner that the liquid inlet opening inside the container will be substantially flush with the container walls. Since the inlet opening must project into the container for a substantial distance, residual amounts of fluid in the container, which do not cover the inlet opening of the discharge mechanism when the container is in an inverted position, cannot be forced from the container and for all practical purposes are lost. In some cases the amount of material wasted is quite large. When the contents of the container are expensive, as in the case of perfumes and medicines, etc., waste of even small amounts of material presents a particularly serious problem.

By means of the drainage or discharge device of the present invention, the dip-tube may be eliminated and most of its objectionable features overcome and yet substantially all of the contents of the container can be effectively discharged without loss. Furthermore, a dose may be discharged from the container while it is in an upright position, with the valve or discharge mechanism facing upward, in spite of the fact that no dip-tube is employed. This feature will be explained in more detail in the specification below.

It is an object of the present invention to provide a convenient drainage or discharge device for use in a pressurized container which permits elimination of the customary dip-tube and which permits more effective scavenging of the contents of the container.

It is also an object of the present invention to provide a draining or discharge device for use in a pressurized container which permits discharge of material from the container while in the upright position and without the aid of a dip-tube.

It is a further object of the present invention to provide an economical and efficient device which permits effective removal of substantially all of the material from a pressurized container.

The above enumerated objects, as well as other objects, together with the advantages of the invention, will be readily comprehended by persons skilled in the art upon reference to the following description, taken in conjunction with the annexed drawings, which describe and illustrate two preferred forms of the device in accordance with this invention.

In the drawings:

Fig. 1 is a top view of an assembly shown in Figs. 2, 3 and 4 which incorporates one form of the device;

Fig. 2 is a section taken along the line 2—2 in Fig. 1 showing a combination of one form of the draining device of the invention in conjunction with an aerosol dispenser employing a metering valve, with the metering valve in the normal or closed position;

Fig. 3 is a view corresponding to Fig. 2 but with the metering valve in the down or open position to discharge a measured dose of material from the container;

Fig. 4 is an inverted cross-section partially in elevation of the combination of Figs. 2 and 3, with the metering valve in the normal or closed position, and showing the manner in which the drainage device of the invention operates to scavenge more material from the container;

Fig. 5 is a front view of one embodiment of the draining device of the invention which is employed in the combination illustrated in Figs. 2, 3 and 4;

Fig. 6 is an enlarged section along the line 6—6 of the device of Fig. 5; and

Fig. 7 is a cross-section of another embodiment of the drainage device of the invention employed in connection with a dispensing valve of the non-metering type.

Referring now to the drawings, wherein like reference numerals denote corresponding parts throughout the several views, the draining or discharge device may be of the types 38 or 58 and may be employed with a pressurized dispensing bottle or container 10, which may be of the aerosol type. The draining or discharge device is essentially a chamber which may be cylindrical, square, spherical or other configuration, with one portion open and with the open end adapted to fit over the valve or closure mechanism so that the device envelops the part of the valve or closure mechanism which projects inwardly into the pressurized container. The chamber shall have a single small hole or orifice 30 located in close proximity to its open portion through which liquid will flow under pressure. The draining or discharge device shall also possess an anchoring means for fixing the device into position surrounding the valve or closure means.

One preferred form of a pressurized container 10, as shown at Figs. 2, 3 and 4, which may be used in combination with the draining device of the invention and which will be described to illustrate the operation of the device of the invention, has a valve housing or shell 11 mounted in the mouth of the container. Said valve shell may be made of any rigid, impervious and corrosive-resistant material, but stainless steel is very suitable. The shell 11 has an aperture 13 at the bottom 12 of the shell at one of its ends. The other end of the shell has an enlarged shoulder 11a leading to an enlarged mouth adapted to receive a gasket 18 of rubber or other resilient material. The housing is mounted in the metal closure or collar 19 which seals the container containing a self-propelling liquid and is crimped at 35 to hold the housing rigidly in position and to provide a seal over the bead 36 of the mouth of the container. This construction serves to both mount the housing in the container and to secure the closure to the mouth of the container. Also assisting in positioning the housing and providing an airtight seal to the closed container is a large resilient or rubber disk 19a which surrounds the housing and which is positioned between the closure 19 and the neck of the container.

The gasket 18 is provided with a substantially cylindrical aperture through which a valve plunger 20 of cylindrical configuration projects upwardly through the gasket and the closure wall. The plunger is a unitary member formed of a solid rod provided with a hollow cylindrical portion 24 and adapted to be slidably mounted in the cylindrical aperture of the gasket 18 and pass through the top of the closure. The cylindrical aperture of the gasket is of such diameter that it frictionally engages the outer walls of the hollow cylindrical portion 24 of the valve plunger 20 and yet provides a substantially airtight seal although readily permitting the plunger to be longitudinally moved therethrough from the closed position of the plunger shown in Figs. 2 and 4 to the discharge position shown in Fig. 3.

The valve plunger 20 has desirably positioned below the hollow cylindrical portion 24 an enlarged portion or shoulder 17 extending outwardly from the plunger so as to engage the surface of the gasket 18 which faces inward. As shown, the shoulder is of such dimension larger than the cylindrical aperture of the gasket that when the plunger is in the closed position the gasket will be pressed between the shoulder and the top of the metal closure to produce a secondary seal. Below the shoulder the plunger is provided with a recess 21 which registers with the aperture 13 at the bottom 12 of the shell. The aperture 13 and the cylindrical aperture through the gasket 18 are in axial alignment so as to position the valve plunger in a non-tilting position and to limit the plunger to substantially longitudinal movement. This further prevents leakage between the cylindrical aperture of the gasket and the cylindrical portion of the plunger.

In order to press the valve plunger into the normally closed position, a spring 16 is positioned within the shell 11 so as to press the shoulder 17 against the gasket 18 and close the system.

The plunger 20 is further equipped with a lateral opening 23 which is in communication with the hollow cylindrical portion 24 at the upper end of the plunger. The lateral opening is so positioned (as shown in Fig. 3 with the plunger in the open position) that when the plunger is depressed to the position where the lateral opening 23 is in communication with the interior of the valve shell 11, fluid under pressure within the shell passes through the lateral passage into the hollow cylinder 24 at the top of the plunger and out of the pressurized container member.

Measured amounts of fluid under pressure are delivered by means of a second valve means coordinated with the first valve means provided by the lateral opening 23. This second valve means is made up, according to one embodiment illustrated by Figs. 2 and 3 in the drawings, of a second sealing gasket 14 of rubber or other resilient material positioned in the bottom 12 of the shell 11 and held in place by a rigid washer 15 of steel or other rigid material which is in turn pressed toward the bottom of the shell by the spring 16. The second sealing gasket 14 and the rigid washer 15 each have a communicating bore or aperture through them through which the plunger 20 passes. The recess 21 of the valve plunger is in registration with the sealing gasket 14 when the plunger is in the closed position, as shown in Figs. 2 and 4. In this position the fluid passes through the channel provided by the recess in the plunger to within the space defined by the shell 11. When the valve plunger is depressed to the open position, as shown by Fig. 3, the recess in the plunger moves downward outside the shell so that it no longer registers with the sealing gasket 14. The cylindrical portion of the plunger which is then in registration with the gasket provides a substantially airtight seal with the gasket and prevents further flow of the fluid into the shell. At the same time the lateral opening 23 of the plunger moves below the rubber gasket 18 into communication with the inner confines of the shell 11 thus permitting the fluid within the shell to escape through the lateral opening 23 into the hollow delivery cylinder or opening 24 of the plunger and out of the dispensing container. When the valve plunger is released the spring 16 forces it to return to the closed position and the space within the valve shell is refilled with a fresh supply of fluid through recess 21 and the process repeated.

It will be apparent that the volume of fluid discharged during each depression of the plunger 20 will be dependent primarily upon the volume within the shell 11 and the gasket 18. The measured and constant amount of fluid is discharged each time. By determining the volume within the valve shell a desired constant quantity of material may be discharged by having the useful substance present in a suitable amount of propellent fluid held under pressure.

In accordance with one preferred embodiment of the draining device of the invention as shown in Figs. 2–6 of the drawings, the draining or discharge device 38 has a cylindrical portion 37 closed at one end 39 and open at the other end 26. Flush with the open end is a flange 25 perpendicular to the axis of the cylinder. The flange also serves as a gasket between the resilient disk 19a and the neck of the container. The flange provides an anchoring means for fixing the draining device about the valve shell 11. An important feature of the draining device is a single small hole or orifice 30 through which liquid can be forced from the container, under pressure, when the container is inverted as shown in Fig. 4, so that liquid covers the aperture 13. Desirably the inner wall 27 of the cylinder is of such diameter that it encloses the shell 11 of the valve with close tolerances so that the quantity of liquid necessary to fill the space between the two is held to a minimum. This reduces the quantity of liquid which is necessary to fill the cylinder and to cover the aperture 13. It has been found that an orifice 30 having a diameter of ⅛ inch is highly satisfactory when employed with a liquid having a viscosity about that of water.

Another embodiment of the invention will be described in conjunction with Fig. 7 of the drawing, in which the draining device 58 is employed in combination with a valve mechanism of the non-metering type. The valve mechanism is similar in many respects to that shown in Figs. 2 and 3, except that it does not have a second sealing means for effectively sealing off the valve shell when the valve is in the open position. In Fig. 7, the valve mechanism is shown in the closed position. The valve mechanism employs a metal collar or closure 48 which is crimped to lock over the top of the container 10 (only a portion of which is shown) at 50 and 53 and is shaped to provide a frictional housing for the valve plunger 20 as shown at 49. The collar 48 is further curved to provide an engagement means at 51 with the rubber disk 19a. The collar 48 is further shaped to provide a rim 52 to lock in the flange 54 of the valve shell 9. The valve shell 9 has a vertical wall 9a having an aperture 13 at its lower end and terminating in the flange 54 which is interposed between the rubber disk 19a and the rim 52 of the metal closure 48. The vertical wall is provided with a notch 8 which serves as a receptacle for the rim 28 of the draining device. Within the shell 9 is positioned the valve plunger 20 having a shoulder 17 which is normally pressed against the rubber disk 19a by the spring 16 which is interposed between the shoulder 17 and the lower end of the shell 9. The valve plunger 20 possesses a lateral opening 23 communicating with a hollow cylinder stem (not shown) of the plunger 20. When the plunger 20 is forced inward into the open position, and lateral opening 23 is moved into the confines of the valve shell 9 discharge of the contents of the container is permitted. Since the valve mechanism is not of the metering type, the liquid contents of the container will discharge so long as the plunger 20 is pressed in the open position and the aperture 13 is covered by the liquid.

The draining device 58 shown in Fig. 7 comprises a substantially cylindrical configuration having vertical walls 29 and a closed end 39. Opposite the closed end 39 is an opening defined by the rim 28 which fits into locking engagement with the notch 8 of the valve shell 9. In close proximity to the rim 28 of the draining device is positioned a narrow orifice 30 through which the liquid contents of the container will be forced under pressure when the container is placed in the inverted position.

The operation of the drainage device of the invention is extremely simple and will be discussed primarily in connection with Fig. 4 of the drawing. The draining device is readily filled by merely inverting the pressurized container and depressing the plunger 20. In doing so the liquid portion of the contents of the container is forced through the orifice 30 of the draining device 38 or 58 under the pressure of the propellant gas or other pressure source under which the system operates. The pressure of the system forces the liquid into the draining device until the device is either filled or the level of the liquid in the container outside the draining device falls below the level of the orifice 30. As shown in Fig. 4, the level of the liquid between the walls of the container and the draining device falls to the position shown at 75 whereas the level of the liquid inside of the draining device can rise to the level of 76. As will be apparent to those skilled in the art, the device of the invention permits the residual liquid contents of the container to be brought into closer proximity to the liquid inlet or aperture 13 of the valve mechanism and thus be more effectively scavenged and discharged from the container. As will be apparent from Fig. 4, only a minute residual amount of liquid is prevented from being scavenged from the system. With the draining device filled with liquid it may be discharged readily by pressing on the plunger 20 or other valve-activating mechanism to effect discharge from the system. In the case of the valve construction shown in Figs. 2-4, metered doses of liquid are expelled, whereas in the case of the valve construction shown in Fig. 7, the quantity expelled is determined by the period of time during which the plunger 20 is forced into open position. After the draining device has been filled with liquid, the pressurizing container may be turned back to the normal upright position and still permit ejection of liquid, since the draining device will contain liquid which will cover the level of the aperture 13. Liquid may be ejected from the system so long as there remains sufficient liquid in the draining device to cover the aperture of the valve system. This is one of the advantages of the device of the invention since it permits dispensing of liquid while the container is in an upright position at the time of discharge, without employing a dip-tube.

The draining device of the invention may be made of a number of synthetic resins or plastics which are reasonably rigid. For example, such materials as polyethylene or polymethylmethacrylate, etc., may be employed.

An advantage of embodiment 38 is that the device can be molded from plastic materials in a one-step operation without additional drilling or boring.

The draining device of the invention may be employed with a number of pressurized container systems although excellent results are obtained by employing as a propellant a non-toxic, liquefied fluorinated or fluorochlorinated lower alkane containing not more than 2 carbon atoms and which possesses a boiling point of less than 75° F. at 760 mm. pressure and a vapor pressure of between about 25 and 65 pounds per square inch gauge at 70° F., and preferably about 30 and 40 pounds per square inch gauge. These liquid propellants are well known and are sold under the trademark "Freon."

As will be obvious to those skilled in the art, the draining device of the present invention may be subject to many modifications. The configuration may be of any type including cylindrical, square, ellipsoidal, etc. The essential characteristics are that the device shall constitute a chamber capable of surrounding the inlet or aperture of the valve mechanism in a fixed position and possess a single small orifice located in as close proximity to the upper wall of the closed container as possible.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A draining device, combined with a pressurized container having a valve, and capable of cooperating with said valve for exhausting the liquid contents of said pressurized container, said container having a mouth, said valve having a housing disposed therearound, and closure means attaching said valve and valve housing to said container mouth, said draining device comprising a chamber means having an open end, a closed end wall and a side wall, a small unitary orifice in said side wall in close proximity to said open end, said chamber means being disposed with said closed end wall extending inwardly into said container and being dimensioned to receive, in encompassing relation, said valve housing, said chamber means having holding means adjacent said open end, said holding means being capable of positioning said chamber means about the inwardly projecting portion of said valve and valve housing in a manner which closes said open end of said chamber means.

2. A draining device as defined by claim 1 wherein said chamber means has a configuration which closely envelops the inwardly projecting portion of said valve housing.

3. A draining device as defined by claim 1 wherein said holding means comprises an outwardly extending flange adjacent said open end of said chamber means.

4. A draining device as defined by claim 1 wherein said holding means comprises an inwardly projecting flange which is capable of positioning said chamber means about an inwardly projecting portion of said valve housing by registration.

References Cited in the file of this patent

UNITED STATES PATENTS

| 2,662,668 | Schmidt | Dec. 15, 1953 |
| 2,681,752 | Jarrett et al. | June 12, 1954 |
| 2,760,693 | Mika | Aug. 28, 1956 |

FOREIGN PATENTS

| 393,646 | Great Britain | June 12, 1933 |